United States Patent [19]
Fiala

[11] Patent Number: 5,657,251
[45] Date of Patent: Aug. 12, 1997

[54] SYSTEM AND PROCESS FOR PERFORMING OPTIMAL TARGET TRACKING

[75] Inventor: Harvey E. Fiala, Downey, Calif.

[73] Assignee: Rockwell International Corporation, Seal Beach, Calif.

[21] Appl. No.: 537,590

[22] Filed: Oct. 2, 1995

[51] Int. Cl.$^6$ .................................................. G01S 13/52
[52] U.S. Cl. ......................... 342/162; 364/572; 382/103; 342/160
[58] Field of Search ........................... 364/516, 517, 364/514 R, 572; 382/103; 342/159, 160, 162

[56] References Cited

U.S. PATENT DOCUMENTS

| | | | |
|---|---|---|---|
| 5,499,195 | 3/1996 | Custelaz | 342/159 |
| 5,557,543 | 9/1996 | Parsons | 364/516 |
| 5,563,806 | 10/1996 | Barry et al. | 364/516 |
| 5,587,929 | 12/1996 | League | 364/516 |

*Primary Examiner*—Ellis B. Ramirez
*Attorney, Agent, or Firm*—Harry B. Field; Lawrence N. Ginsberg

[57] ABSTRACT

A computer-implemented process is disclosed for processing incoming target data from a focal plane or scanning radar to accomplish multiple Target Tracking. Inputs are pixel plane coordinates and intensity of target blips. The Intelligent Target Tracking Processor (ITTP) employs an optimal target tracking algorithm. An optimal observation-to-track assignment exists when all target blips in a new frame of target data are matched up with nearby tracks, such that the sum of all the distances from each target blip to its assigned track is minimized. An expert system is used to control overall processing flow and provide efficient allocation of computing resources. Target blips without near neighbors are allowed to go directly to a real track table of established tracks, if their coordinates match-up with projected tracking gates. Otherwise, target blips are tested sequentially against two-frame, three-frame, and four- or higher-frame discriminants, to reject blips not belonging to established tracks. The ITTP can partition the pixel plane into "bite size partitions", each with a manageable number of target blips, which it handles sequentially. The ITTP is designed to handle hundreds or thousands of targets as a stand-alone processor as is required in space object tracking or military scenarios. The expert system maintains an optimum balance between correlating on existing tracks and discriminating against impossible tracks. A total of 26 different metric and radiometric target tracking discriminants are employed. The ITTP is a dynamically and optimally configured set of general purpose parallel processors.

53 Claims, 2 Drawing Sheets

SYSTEM AND PROCESS FOR PERFORMING OPTIMAL TARGET TRACKING

BACKGROUND OF THE INVENTION

1. Field of Invention

The present invention relates to multiple target tracking (MTT) where hundreds or even thousands of targets are present in each frame of data and more particularly to a method for discriminating against and rejecting false target blips and tracks for optimizing target tracking.

2. Description of the Related Art

In the areas of national defense, air traffic control at busy airports, tracking of the thousands of satellites and other space objects in orbit around the earth, and tracking of the tens of thousands of asteroids in orbit around the sun, the ability for proper target tracking is problematic. Density of traffic near busy airports will increase by a factor of approximately 30 with the increased use of the Global Positioning System, thus requiring simultaneous tracking of several hundred aircraft near airports. This will lead to a genuine need for an Intelligent Target Tracking Processor (ITTP) chip for use in air traffic control applications.

Collision avoidance systems for individual aircraft and automobiles and tracks on congested freeways and busy downtown intersections also have a genuine need for efficient target tracking.

An authoritative reference on recent state of the art of multiple target tracking exists in the book Multiple-Target Tracking with Radar Applications by Samuel Blackman, 1986. Blackman, Samuel S., Multiple-Target Tracking with Radar Applications, 1986, section 14.2, Artech House.

During MTT, real targets can be identified by correlating with known specific characteristics and false targets can be discriminated against by testing against a much broader set of criteria. The current related art does not adequately combine the discrimination and correlation processes to optimize the MTT process.

OBJECTS AND SUMMARY OF THE INVENTION

A principal object of the present invention is to apply, in an optimal manner, all possible target tracking criteria so as to be able to simultaneously and efficiently track thousands of targets, each with its own distinguishable trajectory. This type of scenario exists when tracking space objects in orbit around the earth and is also present in projected military defense scenarios.

Another object is to adaptively provide the right balance between identifying real targets by correlating target data with known specific characteristics and rejecting false targets by discriminating against them by testing against a much broader set of criteria to result in optimal target tracking.

Another object is to provide an optimal observation-to-track assignment which exists when all the target blips in a new frame of target data are matched up with nearby tracks, such that the sum of all the distances from each target blip to its assigned track is minimized. More generally speaking, it is a "total difference function" which is minimized, and not just or necessarily a distance function. This difference function can involve singly, or in combination, discriminants such as distance, velocity, acceleration, intensity, size, and a number of others.

Another object is to provide a stand-alone processor capable of tracking hundreds or thousands of objects by itself.

Another object is to be able to track thousands of objects when used in conjunction with an external resolver such as a neural network configured specifically for MTT. Use of neural networks in general for multiple target tracking applications is covered by Fiala, Harvey E., Jun. 17–21, 1990, Neural Networks for Defense Applications, submitted to the Committee for the International Joint Conference on Neural Networks.

Another object, in the case of defense scenarios, is to provide early surveillance cluster tracking following clump tracking.

Another object, in the case of defense scenarios, is to provide early track file handoff from a cluster of targets.

Another object, in the case of defense scenarios, is to provide early ability of a kill vehicle to maintain individual track fries.

Another object, in the case of defense scenarios, is to provide early ability of a kill vehicle to separate decoys from the real targets.

Another object is to provide one implementation for a test bed baseline tracking capability for evaluating tracking algorithms and tracking devices for both military and commercial uses.

Another object is to implement a collection of general purpose parallel processing algorithms that can be dynamically configured to meet any object tracking application. As will be disclosed below, the present invention uses many general purpose parallel processing units which are assigned and configured in real time to the specific processing load for a given application. Its various processes are monitored by an expert system which allocates its computing resources so as to not saturate any given process.

Another object is to provide a near-neighbor algorithm that will allow all target blips that match up with established tracks and do not have neighboring blips within a certain distance, to bypass all discrimination processes and go directly to a real track table (RTT).

Another object is to implement a parallel processing algorithm to handle the four single-component single-frame discriminants of spectral band, target size, intensity, and radial range; and also the two-component single-frame discriminant of angular position.

Another object is to implement a parallel processing algorithm to handle the three single-component two-frame discriminants of target size rate, intensity rate, and radial range rate; and also the two-component two-frame discriminants of angular heading and angular rate.

Another object is to implement a parallel processing algorithm to handle the three single-component three-frame discriminants of target size acceleration, intensity acceleration, and radial range acceleration; and also the two-component three-frame discriminant of angular acceleration.

Another object is to implement a parallel processing algorithm to handle the three single-component four-frame discriminants of target size jerk, intensity jerk, and radial range jerk; and also the two-component four-frame discriminant of angular heading jerk.

Another object is to implement a parallel processing algorithm to handle up to six single-component five-or-higher frame exotic discriminants of body rotation rate, target emissivity, target absorptivity, target reflectivity, target mass, plume periodicity, and the two-component higher-frame discriminants of target body shape and range insensitive axis. The highly advanced concept of the range insensitive axis discriminant is covered in dept by O'Conner, Dan, MIT Lincoln Labs, Post Boost Vehicle Tracking and RIA Estimation, Proceedings of the SDI Panels on Tracking, Issue No. 1/1991, Apr. 16, 1991.

Another object is to provide a target tracking processor with a variable frame time that adaptively adjusts its value to just the fight duration for completing all required target track processing.

Another object is to provide a target tracking processor with a variable frame time that can be varied in a pseudorandom manner to provide a very high level of resistance to jamming, thus resulting in a highly secure tracking system for military applications.

Another object is to provide an expert system controller (ESC) that will monitor all processes and regulate the many parallel correlation and discrimination processes so as to minimize the time and processing resources required to track all the targets. This includes determining if partitioning of the electronically stabilized pixel plane is required; if so, how to best partition it; regulating whether three-, four- or higher-frame discrimination is required; determining if target intensity and intensity rate can be used as a discriminants; regulate the number of pixels separation distance between blips for "no near neighbors"; adaptively adjust the frame rate to allow sufficient time for all correlation and discrimination processing; to pseudorandomly vary the frame rate to provide resistance to jamming; and to determine whether size rate can be used as a discriminant.

The present invention is a computer-implemented process for performing optimal target tracking of incoming target data from a focal plane. Target data from a focal plane are stored temporarily in frame tables, the data including frames of target blips. The blips are partitioned on a pixel plane representation of the focal plane. The partitions are sized to match the frame tables. The process involves discriminating against and rejecting the blips which do not meet a test of at least one of up to five single-frame discriminants, the remaining blips forming a single-frame set. The blips from the single-frame set which do not meet a test of at least one of up to five two-frame discriminants are discriminated against and further rejected. The remaining blips form a two-frame set. Blips from the two-frame set, which do not meet a test of at least one of up to four three-frame discriminants, are discriminated against and further rejected. The remaining blips form a three-frame set. The remaining blips, if any, are assigned from the three-frame set to candidate tracks in a candidate track table for directing to a real track table or an external resolver, such that the sum of all the distances from each blip to its assigned target track is minimized.

Other objects, advantages and novel features of the present invention will become apparent from the following detailed description of the invention when considered in conjunction with the accompanying drawings.

DETAILED DESCRIPTION OF THE INVENTION

Figure 1:
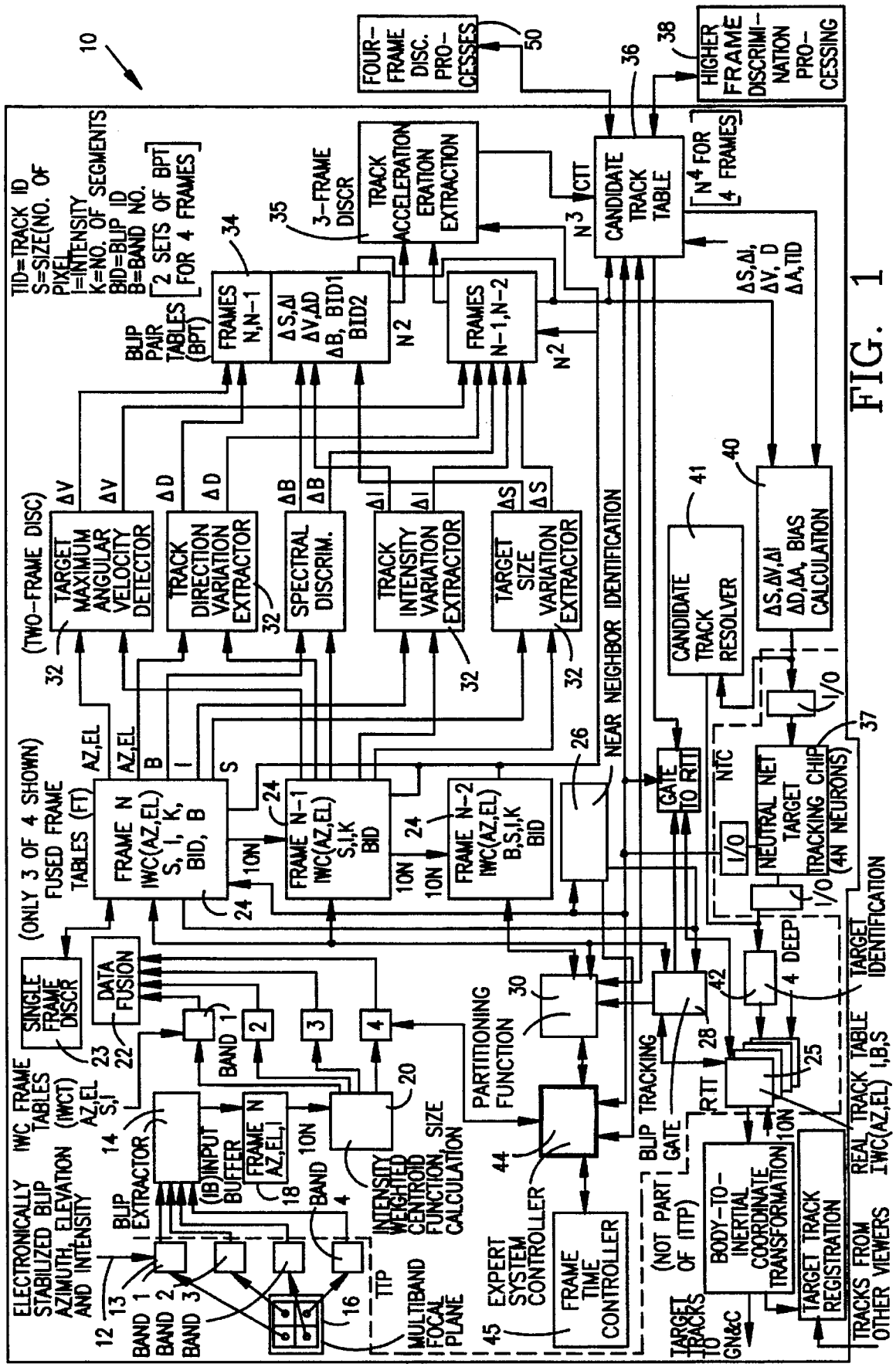
FIG. 1 is a data flow diagram of the computer implemented process of the present invention.

Referring now to the drawings and the characters of reference found thereon, FIG. 1 is a detailed data flow diagram of the Intelligent Target Tracking Processor (ITTP) of the present invention, designed generally as 10. The architecture of the ITTP, as disclosed herein, can track up to 80 targets per partition on the pixel plane during each frame as long as at least 90% of the targets are separated by at least two pixels. Because the ITTP can sequentially process many partitions per frame, it can track 1000 targets or more with suitable frame times. The design analyzed was structured so that it could be used in conjunction with a realizable neural network which was assumed to have a capacity of 8 targets.

Inputs 12 to the ITTP are the pixel plane coordinates and intensity of the target blips detected by the sensor (focal plane or a scanning radar). If the sensor has a multiband focal plane, there are band filters at the output of the focal plane. All required low-level amplification, spectral band faltering, electronic stabilization, pixel response normalization, and digitizing are performed before the target signals enter the ITTP.

Optimal Assignment Process

An optimal observation-to-track assignment exists when all the target blips in a new frame of target data are matched up with nearby existing tracks, such that the sum of all the distances from each target blip to its assigned track is minimized. More generally speaking, it is a "total difference function" which is minimized, and not just or necessarily a spatial distance function. This difference function can involve singly, or in combination, discriminants such as distance, velocity, acceleration, intensity, size, and a number of others. The principles of optimal target tracking are discussed in O'Conner, Dan, MIT Lincoln Labs, Post Boost Vehicle Tracking and RIA Estimation, Proceedings of the SDI Panels on Tracking, Issue No. 1/1991, Apr. 16, 1991.

Target Tracking Discriminants

A target's position, velocity, and acceleration are the most important factors in discriminating against other targets during MTT. Velocity and acceleration are vectors which have magnitude and direction. However, the actual magnitude of the three dimensional velocity and acceleration usually are not available and are not really necessary in many angle tracking systems. Many target tracking systems use a two-dimensional focal plane on which the target's position, velocity, and acceleration appear only as the scalar quantities of angular position, angular heading or angular rate, and angular acceleration. Similarly, where velocity magnitude is available, it is usually in the form of the radial component in a coordinate system centered on the sensor. Therefore, the radial range rate component may be treated individually as a scalar on the focal plane.

Table 1 lists twenty six possible discriminants that can be used for target tracking and registration.

TABLE 1

Target Tracking Discriminants for the Intelligent Target Tracking Processor (ITTP)

| | SCALAR DISCRIMINANTS | SYMBOL | NUMBER OF FRAMES | | | | | APPLICABLE TO TRACKING SPACE OBJECTS | APPLICABLE TO THRUSTING OBJECTS | APPLICABLE TO AIR TRAFFIC CONTROL |
|---|---|---|---|---|---|---|---|---|---|---|
| | | | 1 | 2 | 3 | 4 | 5 | | | |
| | SINGLE-COMPONENT | | | | | | | | | |
| 1 | SPECTRAL BAND | B | 1 | | | | | X | X | |
| 2 | SIZE | S | 1 | | | | | X | X | X |
| 3 | SIZE RATE | Sr | | 1 | | | | X | X | X |
| 4 | SIZE ACCELERATION | Sa | | | 1 | | | | X | X |
| 5 | SIZE JERK | Sj | | | | 1 | | | X | |
| 6 | INTENSITY | I | 1 | | | | | X | X | X |
| 7 | INTENSITY RATE | Ir | | 1 | | | | X | X | X |
| 8 | INTENSITY ACCELERATION | Ia | | | 1 | | | X | X | X |
| 9 | INTENSITY JERK | Ij | | | | 1 | | X | X | |
| 10 | RADIAL RANGE | R | 1 | | | | | X | X | X |
| 11 | RADIAL RANGE RATE | Rr | | 1 | | | | X | X | X |
| 12 | RADIAL RANGE ACCEL | Ra | | | 1 | | | X | X | X |
| 13 | RADIAL RANGE JERK | Rj | | | | 1 | | | X | |
| 14 | TARGET ROTATION RATE | Ro | | | | | 1 | X | X | X |
| 15 | TARGET EMISSIVITY | E | | | | | 1 | X | X | |
| 16 | TARGET ABSORPTIVITY | Ab | | | | | 1 | X | X | X |
| 17 | TARGET REFLECTIVITY | Re | | | | | 1 | X | X | X |
| 18 | TARGET MASS | M | | | | | 1 | X | X | X |
| 19 | PLUME PERIODICITY | Rp | | | | | 1 | | X | |
| | TWO-COMPONENT | | | | | | | | | |
| 20 | ANGULAR POSITION | P | 2 | | | | | X | X | X |
| 21 | ANGULAR HEADING | A | | 2 | | | | X | X | X |
| 22 | ANGULAR RATE | Ar | | 2 | | | | X | X | X |
| 23 | ANGULAR ACCELERATION | Aa | | | 2 | | | X | X | X |
| 24 | ANGULAR JERK | Aj | | | | 2 | | X | X | X |
| 25 | *RANGE INSENSITIVE AXIS | Ri | | | | | 2 | | | |
| 26 | TARGET BODY SHAPE | Sh | | | | | 2 | | | |
| | TOTAL COMPONENTS EACH COLUMN: | | 6 | 7 | 5 | 5 | 10 | | | |
| | TOTAL COMPONENTS ALL COLUMNS: 33 | | | | | | | | | |
| | TOTAL DISCRIMINANTS EACH COLUMN: | | 5 | 5 | 4 | 4 | 8 | | | |
| | TOTAL DISCRIMINANTS ALL COLS: 26 | | | | | | | | | |

TWENTY SIX SCALAR DISCRIMINANTS FOR MULTIPLE TARGET TRACKING
*: A DIRECTION BASED ON DECOY AND RV DEPLOYMENT TRAJECTORIES
TABLE 1: DISCRIMINANTS USED FOR MULTIPLE TARGET TRACKING BY THE INTELLIGENT TARGET TRACKING PROCESSOR THE NUMBERS IN THE TABLE ARE THE NUMBER OF COMPONENTS.

Discriminants that have only a single component and require only a single frame of target data to calculate their value include spectral band, target size, intensity, and radial range. Angular position is a two-component discriminant that requires only a single frame of target data to calculate its value. Discriminants that have only a single component and require two consecutive frames of target data for their value determination include size rate, intensity rate, and radial range rate. Angular rate is a two-component discriminant that requires two consecutive frames of target data to calculate its value. Discriminants that have only a single component and require three consecutive frames of target data for their evaluation include size acceleration, intensity acceleration, and radial range acceleration. Angular acceleration is a two-component discriminant that requires three consecutive frames of target data for its calculation. Discriminants that have only a single component and require four consecutive frames of target data for their evaluation include size jerk, intensity jerk, and radial range jerk. Angular jerk is a two-component discriminant that requires four consecutive frames of target data for its calculation. When applied to a moving target, the term jerk refers to the rate of change of acceleration.

More exotic discriminants exist in terms of identifying target shapes, higher order geometric moments, body spin rates, plume signatures, plume modulation characteristics based upon thruster firing rates, inertial response to energy bursts, and range insensitive axis (RIA). The RIA is that direction along which velocity perturbations do not result in an impact miss. It is an advanced concept using precision tracking to discriminate against decoys in order to identify the real reentry vehicles.

Probably no single MTT application will ever use all of the discriminants listed in Table 1. In any given application, only those discriminants that are cost-effective to implement will be used. However, the basic discriminants of angular position and velocity are almost always used.

Blip Extractor

The blip extractor (BE) 14 gets the X coordinate, the Y coordinate, and the intensity of the signal from each pixel in the focal plane 16 that has a signal above some threshold. The X and Y coordinates are in the electronically stabilized pixel plane coordinate system and are a measure of the target azimuth and elevation in the body coordinate system for the sensor. The data for all pixels with signals above the threshold are stored in the input buffer at the start of each frame of processing.

The BE 14 can get the X and Y coordinates and the intensity for up to 80 blips for each cycle or partition. If there are more than 80 blips on the focal plane, then the focal plane will be partitioned with not more than 8 blips which have near neighbors and up to 72 more blips without near neighbors per partition. Removing and processing more efficiently the blips without near neighbors is the key to tracking large numbers of targets.

Input Buffer

The target data from the blip extractor 14 are stored in the input buffer (IB) 18. The IB holds the electronically stabilized pixel plane X and Y coordinates and the intensity of the illuminated pixels. Although the different tables within ITTP are designed to handle only eight targets per partition or segment with near neighbors, the IB 18 holds the data for as many targets as might be expected in the narrow field of view (FOV) of the sensor. For purposes of this embodiment, the IB 18 capacity has been set to 80 targets.

Intensity-Weighted Centroid Function

The intensity-weighted centroid function IWCF) 20 processes the data from the IB 18. If two or more adjacent pixels are illuminated, the IWCF 20 uses the intensity of the blip from each illuminated pixel and calculates the intensity-weighted centroid (IWC) and the most intense pixel (MIP) of the group of contiguously illuminated pixels. Each group of contiguously illuminated pixels will be treated as one large target, since, at this point in the process, there is no way to know if it is really one large target or several closely spaced, smaller targets.

The IWC and the MIP data are stored in the IWC tables (IWCT). If the target data are from a multiband sensor, there will be one IWCT for each spectral band.

Data Fusion

If there is more than one spectral band on the sensor, then the intensity and possibly the centroid for a given target may have different values in each band. A given target may appear in some bands and not in others, depending on the plume spectral characteristics. For tracking purposes, it is necessary to merge or fuse or put back together the multiband data for each target. This process is called data fusion 22.

Data fusion is not the primary purpose of the ITTP; therefore, a very simple fusion algorithm is considered at this point in the design. The fusion algorithm used for the purposes of this embodiment is that the blips from any two bands which appear on the same or adjacent pixels represent the same target. The groups of pixels from several different bands (on the same sensor) that belong to the same target will be fused with the group that had the greatest MIP and will be assigned to that band. The size and shape of the extended target will be that which encompasses its fused images from all bands in which it appears.

Except to aid in the fusion process, the MIP will not be used any further by the ITTP. The MIP, however, may be used by other processes for the precise determination of an aimpoint on the hardbody of a target. A discussion of aimpoint determination is beyond the scope of this disclosure.

To recalculate the IWC for the composite or fused image, scale factors which represent the different pixel responses and filter gains for the different bands are applied, if needed, to the individual intensifies to be fused.

The fused data are stored in the fused frame tables (FT) 24.

Fused Frame Tables

A FT 24 holds the fused data for up to 40 targets, arbitrarily chosen at 5 times the capacity of a neural network capable of resolving eight target tracks. Hereinafter, a neural network configured for multiple target tracking will be termed an NTC 37, as an acronym for a Neural Network Target Tracking Chip. In addition to the 40 blips in the FT, it is assumed that up to 40 more blips will not have very close neighbors and will not need the full processing of the ITTP, but will be entered directly into the real track table RTT 25 as continuations of already established tracks. This process of bypassing the discrimination testing of the ITTP is described further under Partitioning Function.

There are four FTs 24 for correlation on up to four flames of data. Each time data for a new frame come in, the data for the previous frame are pushed down in the stack, so that the four most recent flames of data are available at all times for the subsequent correlation processes.

The data stored in the FTs 24 include the electronically stabilized X and Y pixel coordinates for each blip IWC for blip groups), its intensity and size, the spectral band number for the band having the largest output, the blip ID (BID), and the number of partitions (K) into which the focal plane is divided. The BID is simply a number for each blip that gives the locating pixel coordinates. If an external resolver is used, the BID will be used to identify to which track a given output from the external resolver belongs.

For a system that uses the MIPs in its body aimpoint algorithm, the FTs 24 will also contain the MIP and its coordinates for each group of blips.

The first of the four FTs 24 holds the fused frame while the nearest neighbor identification (NNI) function (described in the next section) performs its task on the data and it continues to hold the data during and immediately after the results of the single-frame discrimination tests 23. If the NNI 26 finds that a particular blip has no near neighbors and is expected by the blip tracking gate, that blip is removed from the FT 24 and placed directly in its established target track in the real track table RTT 25. After the NNI 26 test is done, if a given blip is rejected by the single-frame discrimination tests, then it is deleted from the first of the four FTs 24. The data remaining in all FTs 24 then undergoes the two-frame discrimination testing 32. Those blips that are rejected by the two-frame discrimination tests 32 are then deleted from the first two FTs 24. Then the data remaining in all FTs 24 undergoes the three-frame discrimination tests 35. Those blips in the FTs 24 and blip pairs in the blip pair tables that are rejected by the three-frame discrimination tests 35 are deleted from their respective tables. Those blip pairs that are not rejected by the three-frame discrimination tests 35 are entered as blip triplet candidate tracks into the candidate track table (CTT) 36. The CTT 36 holds all blip triplet and blip quadruplet candidate tracks. Then four-frame discrimination tests 50 are run on the data in the CTT 36. Candidate tracks that are rejected by the four-frame discrimination tests 50 are deleted from the CTT 36. Then, if higher-frame discrimination processing 38 is implemented, these tests are run. Candidate tracks not meeting the higher-frame tests 38 are then deleted from the CTT 36. Those candidate tracks remaining in the CTT 36 are then entered directly into the RTT 25. Then all data in the FTs 24 are shifted down one table and all blip pair data in the BPT 34 are shifted down one table, then frame cycle begins all over. New fused frame data is entered into the first FT 24.

Nearest Neighbor Identification

The NNI function 26 identifies those blips that are separated from all other blips by at least two pixels. The two-pixel separation assumes that no valid target will move more than one pixel in one frame time. This is a valid assumption even for most advanced military type of targets, but of course it does depend on the pixel density on a given focal plane and the on target range and velocity. At large ranges, a fast-moving target has a small angular rate. At short ranges, a target appears to have a high angular rate; but if a given sensor is tracking that particular target, then its measured angular rate will he near zero to that sensor. So it is possible for the ESC 44 to adjust the number of pixels by which blips must be separated and not have near neighbors as a function of the range to the target.

Those blips that have no near neighbors will not have to go through the subsequent two-, three-, four-, and up to five-frame or higher discrimination processes in the ITTP. All those blips without near neighbors that are expected by the blip tracking gate (BTG) 28, based on the continuation of already established tracks in the RTT 25, will bypass the two-, three-, four-, and higher-frame discriminant testing and will be entered directly into the RTT 25.

For a sensor with a focal plane having only 64 by 64 pixels, and a uniform target density of one target for every 16 pixels (an area of 4 by 4 pixels), as many as 256 targets can be shunted directly from the FTs to the RTT 25. The architecture of the ITTP, as disclosed herein, has the capability for tracking several hundred targets, depending largely on the target density and uniformity of distribution. However, when used with a state-of-the-art focal plane having of the order of 2,048 by 2,048 pixels and the average target blips are separated by 10 to 20 pixels, by suitable design, the ITTP is capable of simultaneously tracking as many as 10,000 targets.

The NNI 26 function performs its tests on all new fused data immediately after it is put into the first of the four FTs 24.

Blip Tracking Gate

The blip tracking gate BTG 28 examines all established tracks in the RTT 25, assumes that they are going to continue, and projects ahead to the current frame what their X and Y pixel coordinates will be. If a new blip in the first of the four FTS 24 is at the expected location or within one pixel of it and does not have any near neighbors then it is assumed to be the expected continuation blip. That blip is then entered directly into the RTT 25 as a continuation track and is deleted from the FT 24 so that it will not have to undergo any of the subsequent discrimination processing.

Partitioning Function

Partitioning 30 is the process of decomposing the set of incoming sensor blips into smaller subsets for separate processing. As the BE 14 begins acquiring pixel data, the partitioning (or segmentation) algorithm counts all the remaining blips after those without near neighbors have been tagged and effectively removed from further processing. If the count of the remaining blips is greater than eight, then those remaining are partitioned into groups of not more than eight. If there are many groups of eight with near neighbors, then it is easier to understand the partitioning function to say that the BE 14 starts extracting blips, with and without near neighbors and when it gets a total of eight with near neighbors, then it calls that a partition and begins on another partition. The blips may be partitioned by horizontal lines, vertical lines, diagonal lines, curved lines, or any path or combination of paths that meet the partitioning constraints. For the design considered in this embodiment, two blips must be separated by at least two pixels to be allowed into different partitions.

Cycle time may be defined as the maximum measured time required to process up to 80 blips in a single partition. Cycle time can depend on the distribution of up to 80 blips in a partition. If the frame time were Q limes as long as a cycle time, then the total capacity of a given ITTP would be 80Q targets. For example, 1040 targets, distributed across the focal plane where only 104 or less are separated by less than two pixels, would require 13 partitions.

Steady-state operation is defined to be after the RTT 25 has track fries on all real targets in the FOV of the focal plane. Prior to this, the partitioning function has to determine the distance from each blip to all neighboring blips in order to know which blips do not have near neighbors and between which blips a partition may be placed if one is required. This process will involve extra computation the first time that it is done, but the then-completed blip map will require further calculations to be made only for the known near neighbors. The pattern of the blips will not change very much from frame-to-frame for short frame times. After three or four frames, a target object map (TOM) from the RTT 25 will be available and will allow the BTG 28 to function.

Discrimination Processes

Figure 2:
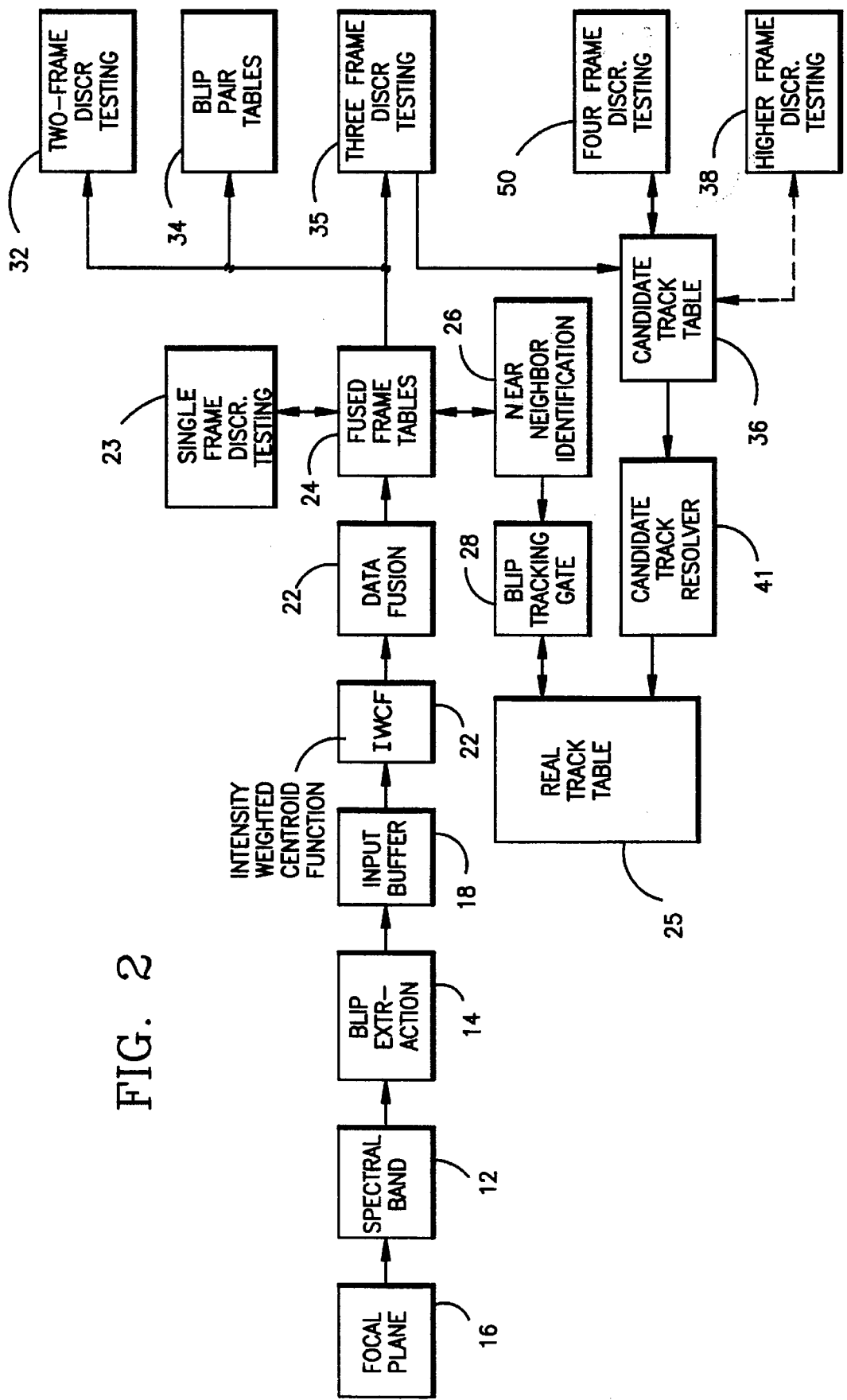
FIG. 2 is a data flow diagram of the discrimination processing of the present invention.

FIG. 2 is an overview of the discrimination processing used within the ITTP. An accurate picture of the incoming energy which contain targets blips is deposited onto the focal plane 16 once every frame. If the focal plane is multi-band (spectrally), then the incoming target blips are present in one or more bands, depending on the bandwidth of the target spectrum and the bandwidth of the individual focal plane spectral bands 13. A process of blip extraction 14 gets the X and Y coordinates and the intensity of the signal from each pixel in the focal plane 16 that has a signal above some threshold. The X and Y coordinates are in the electronically stabilized pixel plane coordinate system and are a measure of the target azimuth and elevation in the body coordinate system for the sensor. The data for all pixels with signals above the threshold are stored in the input buffer 18 at the start of each frame of processing.

An intensity weighted centroid and size process is then performed on all contiguous groups of two or more target blips separately in each band, if the system is multi-band.

If the system is multi-band, the process of data fusion 22 then performed. Where a given target has a wide enough spectral energy bandwidth so that it is above the threshold in more than one band, the process of data fusion will then produce a composite signal which has a better signal-to-noise ratio than that of any one of the bands.

A NNI function 26 is then performed. All blips that are expected by the BTG 28 and have no near neighbors will automatically bypass all subsequent correlation and discrimination processes and be admitted directly to the RTT 25. Those blips entered into the RTT 25 are then deleted immediately from the FTs 24.

Those blips that are not expected by the blip tracking gate or that have a near neighbor are checked by the single frame discrimination processes 23. For example, if it isn't even in the correct quadrant, then it is "dropped" and deleted from the system. If it is in a correct quadrant or direction of interest and is also not dropped by one of the other single-frame discriminants for being in the wrong spectral band, the wrong size, the wrong intensity, or wrong radial range, then this blip will be stored in the first of the four fused frame tables 24 and during the next frame time it will be admitted to the two-frame discrimination processes 32.

The two-frame discrimination processes 32 are actually not examining a single blip, but rather a pair of blips, one from the current frame and one from the previous frame. By subtracting two values you get, for example, the angular velocity of the target or the direction in which it is moving. If none of the two-frame discrimination processes 32 reject the blip-pair for reasons such as not having a correct velocity or for going in the wrong direction, then this blip-pair will be held in the blip pair tables 34 and then admitted to the three-frame discrimination processes during the next frame time.

The three-frame discrimination processes 35 are actually not examining only a blip pair, but rather two blip pairs (which is really only a blip-triplet) based on blips in three consecutive frames so that it can calculate such things as radial acceleration. If none of the three-frame discrimination processes 35 reject the two blip pairs as representing a target which, for example, has a non-real angular acceleration, then it is stored in the candidate track table (CTT) 36.

The four-frame discrimination processes 50 are looking for such things as changes in acceleration due to engine shutdown, engine startup, fuel depletion; or changes in intensity also caused by such things as engine shutdown, engine startup, and the ruing of attitude thrusters. Results of the four-frame discrimination processes are stored in the CTT 36. During the next frame, the results are gated directly to the candidate track resolver (CTR) 41 for resolving the candidate tracks into real tracks. The selected candidate tracks then become real tracks and go to the RTT 25.

If higher-frame (more than four) discrimination processes 38 are implemented, they will function in very much the same manner as the four-frame discrimination processes 50. The difference is that probably all the higher-frame discrimination processes will each be unique and tailored to measuring some particular discriminant involved, such as plume periodicity, target body rotation rate, target body shape, or RIA.

Single-Frame Discriminants

One most practical single-frame discriminant exists. This is the angle at which the target is observed and it is termed angular direction. For example, based on a TOM, a particular interceptor might be commanded to track only the blips or targets in a certain quadrant or sector. In this case, from a single frame, a blip in the wrong quadrant can immediately be rejected without waiting for subsequent frames to arrive to gather and process further information in regards to that blip.

Other single-frame discriminants include the single-component discriminants of spectral band, size, intensity, and radial range.

Two-Frame Discriminants

To determine which blips belong to which real target tracks, the blips in a new frame have to be compared to the blips in previous frames. The worst case is when each blip in one frame has to be compared with all the blips in a previous frame. However, since real targets move around very slowly on the pixel plane, after the first frame, each blip in one frame need be compared only to those within a certain distance of it in the next frame.

By comparing data from two consecutive frames, the angular heading and angular velocity of a target or blip may be determined. These are both two-component discriminants. Also, any differences in the single component discriminants of spectra, intensity, range (assuming range were available), and size may also be noted. If a target is either approaching or receding, its size and intensity will vary accordingly. The spectra of a target could change from one frame to the next if the target is mining, rotating, staging, firing attitude control thrusters, flashing, signaling, or acting as a decoy.

Since a given real target can change direction or velocity only so fast, any blip pattern that appears to be a target that turned a sharp corner or accelerated too rapidly can be rejected as not being a potential real target. However, to the extent that unidentified flying objects (UFOs) are real, there are exceptions to these criteria.

The goal of the two-frame discrimination processes 32 is to compare the data from two consecutive frames and eliminate those blip pairs that could not possibly represent the track of a real target. For example, if a blip in one frame had a very high intensity and a blip in the next frame had a very low intensity, those two blips probably did not come from the same target (unless an engine shut down between the two frames). Similarly, if two blips had significantly different sizes, they probably would not be from the same target. This line of reasoning holds true for velocity, direction, spectral band, intensity, and size. The results of the two-frame discrimination tests are recorded in the blip pair tables (BPT) 34.

Programming an ITTP to reject targets that accelerate too rapidly and change direction too rapidly because they are probably not real brings up a very interesting point relating to actual flying objects whose identity is unknown and also relating to very high performance military or space vehicles whose performance could be highly classified. If an ITTP can be programmed to reject such "high performance" vehicles, it can also easily be programmed to identify such vehicles. It is frequently reported that unidentified flying objects (UFOs) change direction rapid/y, accelerate rapidly, and sometimes disappear. By parameterizing the NNI algorithm and the two-, three-, and four-frame discrimination criteria, an ITTP could be programmed to identify such high performance vehicles, or place them into a special class that warrants further investigation or specific treatment.

Blip Pair Tables

The BPTs 34 contain the results of all two-frame discrimination processes. Since the ITTP discriminators (for purposes of this disclosure) are designed to handle eight targets, each BPT 34 has slots for all 64 possible pairs of blips from two consecutive frames. There are three BPTs 34: one for frames N and N-1, one for frames N-1 and N-2, and one for frames N-2 and N-3. N represents the current frame, N-1 the previous frame, N-2 the frame before that, etc.

The BPTs 34 contain the velocity; variations in direction, intensity, size, and spectral band; and the BIDs for all pairs of blips that survived all the two-frame discrimination tests. This number will probably be 32 pairs or less.

Three-Frame Discrimination Processes

After the two-frame discrimination processes 32 have eliminated many of the blip pairs as being unrealizable, three-frame discrimination processes 35 can eliminate further blip triplets as being unrealizable. The standard single-component three-frame discriminant is radial range acceleration. Acceleration is calculated from three consecutive frames of data. Two other singular-component three-frame discriminants are intensity acceleration and size acceleration. A two-component three-frame discriminant is angular acceleration.

If the sensor-to-target range is increasing or decreasing sufficiently rapidly, there may be a measurable rate of change of range, intensity, or size that might also be used as a discriminant; however, these are less likely to be usable. If the range rate were large enough for intensity or size rate discrimination to be useful, then the intelligent controller would automatically activate the appropriate discrimination process. Depending on the design, parallel processors might be used, or one generic subroutine might be called sequentially to do all of the three-frame discrimination processes if sufficient time permits. The results of the three-frame discrimination processes are recorded in the candidate track table CTT 36.

Four-Frame Discrimination

For thrusting targets, two practical discriminants are the rate of change of angular acceleration and radial range acceleration, calculated from four consecutive frames of data. During the boost phase for a constant thrust missile, its acceleration will increase as its propellant burns and its mass reduces. Also, as thrust first begins or ends, or as it is turned on or off for control purposes or for staging, the missile undergoes a very large rate of change of acceleration. The rate of change of acceleration is termed jerk. The results of the four-frame discrimination processes 50 are recorded in the CTT 36.

Candidate Track Table

The CTT 36 records the results of the three-frame discrimination and the four-frame discrimination processes. It has slots for all 4,096 possible combinations of four blips taken one each from four consecutive flames. Each two-frame record (blip pair) in the BPTs 34 points directly to those blocks of three- and four-frame records in the CTT 36 that include the blip pair.

There will probably be under a dozen sets of four blips that survive all the two-, three-, and four-frame discrimination processes. For these surviving tracks, the CTT 36 contains the following data: velocity and acceleration; variations in direction, intensity, and size; the BIDs; and a track ID that is used only to number the candidate tracks in the CTT 36. Each track ID and its four associated BIDs will be used to associate the outputs of the Candidate Track Resolver (CTR) 41 with their correct real target tracks.

If there were eight targets in the pixel plane that were not separated by at least two pixels, then there will be 4,096 possible combinations of blips as candidate tracks. But in reality, the two-frame discriminants will have eliminated most of these candidate tracks as being unrealizable. For example, there might be 20 to 40 entries in the CTT 34 that represent the realizable pairs. The three-frame discriminants will further reduce this number to probably between 10 and 20. A four-frame discriminant will probably reduce the number to between eight and ten. There must be at least eight entries remaining as long as there were eight real targets in the partition. Of course some of the candidate targets could have been noise blips. Even though there are only a dozen or so blip quadruplets left that are realizable tracks, all 4,096 table entries are required, because there is no way of knowing ahead of time which slots will contain the "winning" tracks.

The "hardwired" tables with locations for all possible combinations of two, three, and four blips were chosen over a variable-length linked-list approach because the first approach eliminated numerous sorting and matching processes that would have significantly increased the computational time. An appreciable increase in the size of the CTT 36 saved a lot of computation time and was judged to be the best tradeoff. However, for a three- or four-frame processor with a linked-list approach, the CTT 36 would have required a maximum of only about 20 records instead of 512 or 4,096 and the BPTs 34 could also have been shortened from 64 to about half as much.

The designs of the FTs 24 and the CTT 36 are dependent upon each other. Each two-frame record in the BPTs 34 has pointers to those blocks of three- and four-frame records in the CTT 36 that include the blip pairs from the two-frame record. This approach eliminates the need for numerous search and sort processes, resulting in quicker processing.

Higher-Frame Discriminants

Where the target density is such that the two-, three-, and four-frame discrimination tests have not eliminated all the false target tracks, the ITTP can be configured to run tests using five-frame or even higher-frame discrimination processing 38 if the target information is available to run such tests. Examples of scalar discriminants requiring from single-frame to five-frame or even higher-frame counts to gather the data include target body rotation rate, target emissivity, target absorptivity, target reflectivity, target mass, and plume periodicity. A scalar discriminant requiring single-component multiple-frame discrimination for a thrusting target is plume periodicity. Two discriminants requiting two-component multiple-frame discrimination are the Range Insensitive Axis and target body shape. For example, different target body shapes are each represented by a first component and a second component is a measure of an eccentricity or length-to-width ratio. It is not the purpose of this section to discuss how these various "exotic" discriminants might be measured. In some cases the technique for acquiring and measuring the data might be classified.

The higher-frame discrimination processes 38 are shown in FIG. 1 as one block which receives information from the four-frame discrimination processes and provides its output to the CTT 36. Once one or more of the seven properties listed above under higher-frame discriminants are catalogued for certain of the targets, incoming target blip data is compared to try to find a match. If a match is found, that blip is passed by the BTG 28 directly to the RTT 25. If a match is not found, that blip goes into the CTT 36 and a bias current is calculated for it. The ITTP will use an analog-to-digital converter and a summing linear amplifier to compare the bias currents to select the appropriate candidate tracks to be the real tracks. If the ITTP has been configured with an NTC 37 as a post-processor, then the NTC 37 evaluates the bias current and selects the appropriate candidate track to be a real track.

Frame Time Controller

The Frame Time Controller (FTC) 45 is under the control of the ESC 44. It has two considerations which govern the frame time. First, the frame time is adaptively increased until the ITTP has enough time to accomplish all of the required target track processing. Secondly, the frame time can be varied in a pseudorandom or other manner to provide a very high resistance to being jammed by unfriendly or other radar sets. It is common knowledge that one of the most classified parameters of a military or defense tracking system is the frame time or frame rate, because of its vulnerability to being jammed at its frame rate. Well, now, just like on Star Trek; the frame rate can be varied pseudo-randomly or even totally randomly since it can operate as a stand-alone processor.

Bias Current Calculation

Whenever there are candidate tracks that are not assigned to existing tracks, new tracks not yet in the RTT, have to be assigned by careful analysis. A composite bias current is calculated for each candidate track for use by the candidate track resolver or by an external resolver if one is used in conjunction with the ITTP.

The modified Hopfield neural network on the NTC 37 requires bias currents to be supplied to it. Each candidate track must have a bias current 40 that is a calculated and representative measure of itself. For example, a track that appeared to have a large (and unrealizable) increase in velocity from the second blip to the third blip would correspondingly have a very large bias current. The Hopfield neural network compares all the bias currents in the correct groupings and selects the candidate tracks with the smallest bias currents to be the real tracks in each group for which comparisons were made. As long as the candidate tracks selected to be real tracks are in fact real tracks, they will go straight to the RTT in future frames and will no longer tie up discrimination resources and candidate track resolver resources. There will always be candidate tracks, because by definition, blips get entered only if they have near neighbors thus causing proper track selection to be difficult. Without an NTC serving as an analog comparator, the ITTP will sum and compare the bias currents digitally.

Those track candidates that survived all the two-, three-, four- and higher-frame discrimination tests will have small bias currents calculated for input to the NTC 37. Bias currents representing variations from the ideal value for a candidate track may be calculated for angular velocity and acceleration; variations in angular direction, intensity, and size; and acceleration rate, range, and range rate. If applicable, bias currents will be calculated also for intensity rate and size rate. If range and spectral band are used, they each will require one component of bias current. If change in range rate (range jerk) is used, this will require one component. If change in angular acceleration (angular jerk) is used, this will require two components. All the implemented components (up to a possible total of 33—see Table 1) of the bias current for a given candidate track will be summed to form the total bias current for that candidate track. At the appropriate time in the ITTP cycle within each frame, the bias currents will be inputted to the NTC 37. In future frames, as long as the recently resolved and new real tracks have no new neighbors, they will no longer be candidate tracks requiring bias current calculation.

Candidate Track Resolver

The CTR 41 uses an analog-m-digital converter to convert all composite bias currents to a digital representation. For each group of candidate tracks for which a real track must be selected, the CTR will then select the candidate track with the lowest value to be the real track. This track will then be entered directly into the RTT. An external resolver such as an NTC 37 configured for MTT can perform the candidate track resolution function.

Neural Network Target Tracking Chip

For any group of two or more candidate tracks which share one or more blips, the NTC 37 will compare their individual bias currents. For all such groups of two or more candidate tracks, the NTC 37 will select the combination of candidate tracks having the lowest total bias currents to be the tracks generated by the real targets.

The modified Hopfield neural network is called modified because each neuron is not fully interconnected to all other neurons. Each neuron may be thought of as simply an analog comparator that selects the lowest of two or more input currents or voltages. It is important to note that the function of the NTC 37 can be completely performed using analog or digital comparators as a part of the ITTP design.

The output of the NTC 37 goes to the track identification function (TID) 42 function.

Part of the reason for the extensive detailed description of the ITTP is to gain some visibility into the interface between an ITTP and an external resolver, since Rockwell International has done work in the area of an NTC 37, which can function as an external resolver.

Track Identification Function

The TID 42 for each output from the CTR 41 or an external resolver is used to identify the BIDs for the four blips that made up the candidate track. The four BIDs identify which candidate tracks represent the real tracks. The real tracks are then entered into the RTT 25.

Real Track Table

The RTT 25 contains the data on all the track continuations that were shunted to it by the BTG 28 after the nearest neighbor identification process, those four-frame tracks sent to it directly from the CTT 36, and any tracks established by the CTR 41 or an external resolver. The RTT 25 holds data for up to 80 tracks. The RTT 25 has the capacity to hold more tracks than the number of blips (40) entered into the FT 24 because the partitioning process may have shunted into the RTT 25 the continuation tracks for up to 40 more blips that did not have near neighbors and did not need further ITTP processing. Because unexpectedly large numbers of target tracks could bypass the discrimination processes, depending on the target distribution, it would be almost free to increase the capacity of the IB 18 and the RTT 25 to hold not 80 but several hundred or even a thousand targets. This would be the lowest cost way to significantly increase the overall capacity of the ITTP.

The data stored in the RTT 25 consist of the electronically stabilized X and Y pixel coordinates for each blip (IWC for blip groups), their intensity, size, and spectral band number. The data also include the number of partitions (K) into which the focal plane is divided for a given frame. The RTT 25 serves as the model for the FTs 24.

The output from the RTT 25 goes to the user. The output tracks will require a transformation from the stabilized pixel plane coordinates to the user's coordinate system. This transformation of coordinates involves tensor manipulation and is not a function of the ITTP.

Expert System Controller

The main purpose of the expert system controller ESC 44 is to adaptively provide the right balance between identifying real targets by correlating target dam with known target characteristics and rejecting false targets by discriminating against them by testing against a much broader set of criteria for unrealizeable target tracks to result in time-wise optimal target tracking. It will accomplish this by regulating and providing the proper balance between the various discrimination and correlation processes in order to minimize the time within each frame required to track all targets in realistic high-density target scenarios.

The ESC 44 can control the frame time or frame rate through its interface with the FTC 45. The ESC 44 will adaptively increase the frame time until the ITTP has enough time to accomplish all of the required target track processing. The ESC 44 can also vary the frame time or frame rate in a pseudorandom or other manner to provide a very high resistance to being jammed by enemy radar sets. One of the most classified parameters of a military or defense target tracking system is the frame time or frame rate, because of its vulnerability to being jammed at its frame rate. The ESC 44 can vary the frame rate even totally randomly since the ITTP can operate as a stand-alone processor.

The expert system controller ESC 44 monitors the number of blips entered into the FTs 24, the number of blips (track continuations) entered directly into the RTT 25 that bypassed the FTs 24, the number of partitions, the number of blips entered into each partition, the number of tracks in the CTT 36, the number of tracks going directly from the CTT 36 to the RTT 25, the number of tracks going into the CTR 41 or an external resolver, and the total time required by the ITTP and the CTR 41 or an external resolver to complete their individual processing. The data collected by the ESC 44 will be entered into its data base.

The ESC 44 can change the ITTP from correlating on four flames to correlating on only three, if conditions permit. This will allow the ITTP to perform its task sooner and allow the frame rate to be increased. The ESC 44 can also require correlation on five or more flames, if this has been implemented and is required.

The ESC 44 will determine if partitioning of the pixel plane is needed and will monitor the number of partitions at all times. It will monitor the RTT 25, which is really equivalent to a TOM, and use this, in conjunction with a set of rules, as the basis for how best to partition the pixel plane if and when needed. The knowledge base for the ESC 44 contains the rules on how best to partition the pixel plane.

The ESC 44 will monitor the uniformity of blip intensity across the pixel plane and determine if the response of the focal plane is uniform enough to permit target intensity to be used as a discriminant. Uniform response of focal planes from pixel to pixel has been a distinct problem for focal planes in the recent past.

The ESC 44 will monitor the rate at which target intensity and size vary to determine if intensity rate or size rate can be used as a discriminant for targets that approach or recede rapidly. If feasible and required, the ESC 44 will implement this discrimination using parallel or serial processing as may be available.

The ESC 44 will regulate the number of pixels by which blips must be separated in order to be considered as having no near neighbors.

For large numbers of targets, the function of the ESC 44, when working in conjunction with an external resolver, is to regulate its various correlation processes to provide as many candidate tracks to the external resolver as it can handle, but not to saturate it. At the point of saturating an external resolver, the ESC 44 will increase its correlation processes ahead of the external resolver and increase the number of partitions and/or frame time if necessary. As shown in previous studies, if the number of partitions is doubled, the computational load drops to only about 25 percent of its former value. This is possible because the correlation time of an external resolver which is an NTC is less than the processing time of the ITTP.

Anti-Jam Capabilities Of The ITTP

The frame rate is probably the most sensitive parameter in a tracking system because of its vulnerability to being jammed at the frame rate. However, the ITTP will have a very high level of resistance to jamming because the Frame Time Controller (FTC) 45 is under the control of the ESC 44. First, the frame time is adaptively increased until the ITTP has enough time to accomplish all of the required target track processing. Secondly, while still meeting the required processing time, the frame rate can be varied in a pseudorandom or totally random manner to provide a very high resistance to being jammed. This is possible because the ITTP can function entirely as a stand-alone processor.

SDI Panels On Tracking

The Institute for Defense Analysis (IDA) used to regularly conduct a meeting entitled The Panels on Tracking. Three separate panels would meet. The three panels were the Panel on Tracking Parameters, the Panel on Critical Issues in Tracking, and the Panel on Advanced Concepts (in tracking).

The Panel on Advanced Concepts identified two major issues in tracking: early individual target tracking after cluster tracking and the development of parallel algorithms for real-time high-performance tracking.

The ITTP is well suited to the application of the earlier individual tracking of clustered objects. Earlier individual tracking of objects was its principal design goal.

As shown in the data flow diagram for the ITTP in FIG. 1, the ITTP lends itself very well to the use of parallel processors. The multiband signals may be retrieved from the focal plane and processed in parallel. The IWC process may be performed in parallel for each band. All two-frame discriminant processes may be done in parallel, all three-frame discriminant processes may be done in parallel, and all four-frame discriminant processes may be done in parallel.

The Panel on Tracking Parameters identified the scoring of tracking algorithms with respect to parallel processing as a key issue. Because the ITTP has so many tasks and subtasks which can be performed in parallel, it lends itself well to the use of parallel processing and scores high on this key issue.

SUMMARY

The ITTP is a robust design for a stand-alone target tracking processor for target densities in the thousands. By adaptively adjusting its frame time to allow for all required target track processing, it can handle large numbers of targets. Furthermore, by varying the frame rate in a pseudorandom or totally random manner, the ITTP can have a very high resistance to jamming.

The architecture of the particular embodiment of the ITTP, as disclosed herein, can handle up to 80 targets on the pixel plane without partitioning. However, these same inventive principles can be extended to much larger architectures. The design includes a "nearest neighbor" function and a tracking gate based upon established target tracks in the RTT 25. This combination allows all blips without near neighbors to bypass all other discrimination or correlation processes and be entered directly into the RTT 25. The design includes two-, three-, four-, and higher-frame discriminants. It also includes an ESC 44 for determining which discrimination or correlation processes are needed, if partitioning is needed and how to partition, and if target intensity and size can be used as discriminants. The embodiment shown herein can handle up to 80 targets per partition, depending on the target density, processor speed, and the frame time. By increasing the frame time adaptively, the ITTP can correspondingly handle that many more partitions and hence many more targets.

The ITTP can provide an improved solution to interceptor and surveillance tracking problems for autonomous SDI satellites. Target track identification and registration are dependent upon a robust target tracking process such as that offered by the ITTP.

For SDI surveillance and interceptor tracking, the ITTP offers improved performance in the following areas: (1) earlier surveillance cluster tracking following clump tracking, earlier track file handoff from the cluster, (3) earlier ability of a kill vehicle to maintain individual track fries, (4) earlier ability of kill vehicle to separate decoys from the real target, and (5) one implementation for a test bed baseline tracking capability for evaluating tracking algorithms and tracking devices.

GLOSSARY

This glossary contains the definition of many technical terms and acronyms associated with the ITTP and multiple target tracking in general. Because of the complexity involved in this disclosure, and because of the extensive tutorial discussion incorporated in this disclosure, it is felt that this glossary will fill an important need even for the reader skilled in the art.

Algorithm: A procedure or sequence of computer program steps for solving a problem or accomplishing a task.

Angular Heading: The angular direction in which a target is moving.

Angular Jerk: The rate at which a target's perceived angular acceleration changes. This would be observed for a target that was changing its angular heading or going through evasive maneuvers.

Angular Position: The angular direction in which a target is located.

Angular Rate: The rate at which a target changes angular position. It could also be defined as the rate at which a target changes angular heading.

BID: Blip ID. An identification number for Blip.

Body Coordinate System: A coordinate system related directly to the body of the structure or vehicle to which the sensor or focal plane is mounted.

BTG: Blip Tracking Gate

Clump: A clump is when many targets are not separated by at least one pixel. A clump might be a group of 100 missiles all launched from one site as seen from a point several thousand kilometers away. A clump can contain clusters and a cluster can contain clumps.

Cluster: A cluster is when there are many targets, and some of them are separated by at least one pixel, but not enough separation on which to establish separate tracks. A cluster might be all the different missiles from a clump as soon as they start to separate and are individually discernible. A cluster can also be formed by a single RV that has deployed from 50 to 100 decoys. A cluster can contain clumps and a clump can contain clusters.

CTR: Candidate Track Resolver. The CTR examines bias currents for the different candidate target tracks and selects the best possible blips combinations to represent real tracks. When the ITTP is used in conjunction with an external resolver, resolving the candidate tracks is done by an external device such as an NTC.

CTT: Candidate Track Table. The CTT records the results of the three-frame discrimination and the four-frame discrimination processes. It has slots for all 4,096 possible combinations of four blips taken one each from four consecutive flames. Each two-frame record (blip pair) in the BPTs points directly to those blocks of three- and four-frame records in the CTT that include the blip pair.

Cycle Time: Cycle time may be defined as the maximum measured time required to process up to 80 blips in a single partition. Cycle time can depend on the distribution of up to 80 blips in a partition. Cycle time is the time required to completely process a partition. If a frame were ten cycles long, the capacity of the ITTP would be ten time 80 or 800 targets.

Data Fusion: See Fusion.

Discriminant: A test used for rejecting an input blip as a candidate for belonging to an already established target track. For example, if targets only in a small sector, say between 30 and 40 degrees were of interest, then a blip at 47 degrees would be rejected. It takes only one frame of data to determine a targets direction. Similarly, if only passive targets were of interest, then any accelerating targets would be rejected. It requires three flames to determine a targets acceleration. If only targets above a certain size were of interest, then all those below that size would be rejected. It requires only one frame of data to determine a target's size. If only "red" targets were of interest, then all "non-red" targets would be rejected. It requires only one frame of data to determine a targets color (spectral band). If only approaching targets were of interest, then all receding or sideways moving targets would be rejected. It requires only two flames of data to determine a targets angular heading. All discriminants are classified according to how many flames of data is required for their measurement. The ITTP uses all single-frame discriminants through five-frame discriminants in the optimum order to minimize processing time and processing resources.

Electronic Stabilization: The composite motion on a focal plane of a target blip is due to the separate motions of the target and the focal plane itself. In order to get only the target motion for target tracking purposes, an inertial guidance system or a stable platform on the body to which the focal plane is mounted, is used to sense only the vehicle body motion. The body motion is then subtracted from the composite motion on the focal plane to get just the target motion. The pixel plane coordinates are then considered to have been electronically stabilized.

ER: External Resolver. In the case of the ITTP, an external resolver could be an NTC.

ESC: Expert System Controller

FOV: Field of View

Frame Time: The time that it takes to completely collect and process all target information from all partitions on the focal plane before filling up the focal plane with new target data. If the focal plane is divided into 10 partitions, the frame time must be at least 10 cycles long. The frame time is adjustable to allow sufficient time for all required processing and is modulatable pseudorandomly to provide resistance to jamming.

FT: Frame Table

FTC: Frame Time Controller

Fusion: The process of combining the position and possibly other data from more than one viewer of a given target to improve the quality or precision of the data on that target.

GN&C: Guidance, Navigation, and Control

Handoff: Handoff is defined as the transfer of a track file from one sensor to another sensor system in which the first sensor or system continues to track the object.

Handover: Handover is defined as the transfer of a track fie from one sensor or system to another system in which the first system does not continue to track the object.

Hopfield Neural Network: The Hop field model is a single layer network of processing elements, where the output from each node is fed via connection weights to the input of every other node.

IB: Input Buffer

ID: Identifying number.

IDA: Institute for Defense Analysis

Inertial Coordinate System: A coordinate system in which the axes are stationary in space. The axes are usually established with an inertial or stable platform.

Intensity Jerk: The rate of change of the rate at which intensity changes. This is experienced whenever a rocket engine ignites or is turned off, or when thrusters fire on and off.

ITTP: Intelligent Target Tracking Processor

IWC: Intensity Weighted Centroid

IWCF: Intensity Weighted Centroid Function

IWCT: Intensity Weighted Centroid Table

Jerk: The rate of change of acceleration which is the third derivative of distance or range or angle. When not dealing with kinematics, the term jerk may generically be used to refer to the third derivative of a parameter such as intensity or size.

MIP: Most Intense Pixel

Modified Hopfield Neural Network: A modified Hopfield neural network is called modified because each neuron is not fully interconnected to all other neurons. Each neuron may be thought of as simply an analog comparator that selects the lowest of two or more input currents or voltages.

MTT: Multiple Target Tracking.

Multiple Collectors: When target data is collected by more than one radar, such as a surveillance radar and an interceptor radar. In order to fuse data from more than one collector, the data would have to be transformed to a common coordinate system and registered. Here the word radar is used generically. In practice, Ladar (Laser Radar) is more precise in determining target coordinates.

Multiple Target Tracking: The simultaneous tracking of more than one target by a single tracking system.

NNI: Nearest Neighbor Identification

NTC: Neural Network Target Tracking Chip. This is an acronym for a neural network that is configured for multiple target tracking and is butt on a chip. Rockwell International has done breadboard and simulation testing on such a concept. One purpose of this invention disclosure is to help define an interface between the ITTP and an external resolver such as an NTC.

Optimal Target Tracking: An optimal observation-to-track assignment exists when all the target blips in a new frame of target data are matched up with nearby tracks, such that the sum of all the distances from each target blip to its assigned track is minimized. More generally speaking, it is a "total difference function" which is minimized, and not just or necessarily a distance function. This difference function can involve singly, or in combination, discriminants such as distance, velocity, acceleration, intensity, size, and a number of others.

Partitioning: Partitioning is the process of decomposing the set of all sensor blips into smaller subsets for separate processing. The partitioning (or segmentation) algorithm counts all the remaining blips after those without near neighbors have been tagged and effectively removed from further processing. If the count of the remaining blips is greater than eight, then those remaining are partitioned into groups of not more than eight. They may be partitioned by horizontal lines, vertical lines, diagonal lines, curved lines, or any path or combination of paths that meet the partitioning constraints. Two blips must be separated by at least two pixels to be allowed into different partitions.

Pixel Plane Coordinate System: The same as the focal plane coordinate system, but after electronic stabilization to compensate for body motion. For a focal plane which is rigidly fixed to the body structure, a Cartesian body coordinate system can be obtained by a simple translation and rotation of the focal plane or pixel plane coordinate system. For a focal plane which is scanning relative to the body structure, the scanning motion has to be considered when transforming from one coordinate system to the other. For a focal plane which is fixed to the body structure, the apparent motion of the target on the pixel plane is really the relative angular motion between the real target angular motion and the sensor or body angular motion. The stabilized pixel plane coordinate system uses inertial sensors to sense and remove the body motion so that the resulting blip motion on the stabilized pixel plane is only real target angular motion.

Radial Jerk: The rate of change of radial acceleration. This is experienced when any rocket engine is fired or shut off. It is also experienced when the acceleration is increased as the mass is reduced while the fuel is being used up with the thrust remaining constant.

Range Insensitive Axis: That direction along which velocity perturbations do not result in an impact miss It is an advanced concept using precision tracking to discriminate against decoys in order to identify the real reentry vehicles.

Registration: See Target Track Registration.

RIA: Range Insensitive Axis.

RTT: Real Track Table

RV: Re-entry vehicle.

Seeker Tracking: The tracking of a target by the seeker on a vehicle.

Segmentation: See Partitioning.

SDI: Space Defense Initiative

Size Acceleration: The rate of change of the rate at which a target appears to change size. A rapidly accelerating will appear to have size acceleration.

Size Rate: The rate at which the size of a target appears to change. This is normally experienced for targets which are approaching or receding with a constant velocity with respect to a viewer.

Size Jerk: The rate of change of the size acceleration of a target. This can occur when a target discards a larger booster and continues on as a smaller size, or when a decoy inflates, or when a target deploys antennas or shields.

Stabilized Pixel Plane Coordinate System: See Pixel Plane Coordinate System.

Surveillance Tracking: Tracking of a very distant in the early stages when only clumps or clusters might be visible. Later on, as the range reduces, individual targets will become discernable. Surveillance tracking is usually done by a larger facility.

Target Fusion: Target fusion is the process by which target blip data from more than one observer is combined in an attempt to improve the quality or precision of the data.

Target Track Registration: Target track registration is the process whereby multiple viewers can see many different target tracks. If the tracks are numbered 1 through N, each viewer can identify which target track is which because the same track will have the same number for each viewer.

Target Tracking: By means of a focal plane or a scanning radar, determining the coordinates of an object once per frame or cycle so that the trajectory of the object is known.

Tensor: A set of N (to the r) components which are functions of the coordinates of any point in n-dimensional space. A tensor is ideally suited to adequately describe the two dimensional coordinates of a focal plane when non-linearity s of spectral response and gain are taken into account for each pixel in the focal plane.

TID: Track ID. Identification number for a target track.

TOM: Target Object Map

Obviously, many modifications and variations of the present invention are possible in light of the above teachings. It is therefore to be understood that, within the scope of the appended claims, the invention may be practiced otherwise than as specifically described. What is claimed and desired to be secured by Letters Patent of the United States is:

I claim:

1. A computer-implemented process for performing optimal target tracking of incoming target data from a focal plane, said data including frames of target blips, comprising the steps of:

a) storing target data from a focal plane temporarily in frame tables, said data including frames of target blips;

b) partitioning said blips on a pixel plane representation of said focal plane into partitions sized to match said frame tables;

c) discriminating against and rejecting said blips which do not meet a test of at least one of up to five (5)

single-frame discriminants, the remaining blips forming a single-frame set;

d) discriminating against and further rejecting said blips from said single-frame set which do not meet a test of at least one of up to five (5) two-frame discriminants, the remaining blips forming a two-frame set;

e) discriminating against and further rejecting said blips from said two-frame set which do not meet a test of at least one of up to four (4) three-frame discriminants, the remaining blips forming a three-frame set; and, f) assigning said remaining blips, if any, from said three-frame set to resulting target tracks in a candidate track table for directing to a real track table or an external resolver, such that the sum of all the distances from each blip to its assigned target track is minimized.

2. The process of claim 1, further comprising a step of discriminating against and further rejecting said blips from said three-frame set which do not meet a test of at least one of up to four (4) four-frame discriminants, the remaining blips forming a four-frame set, which are assigned to said resulting target tracks.

3. The process of claim 2, further comprising a step of discriminating against and further rejecting said blips from said four-frame set which do not meet a test of at least one of up to eight (8) higher-frame discriminants, the remaining blips forming a higher-frame set, which are assigned to said resulting target tracks.

4. The process of claim 1, wherein one of said single-frame discriminants comprises a spectral band.

5. The process of claim 1, wherein one of said single-frame discriminants comprises size.

6. The process of claim 1, wherein one of said single-frame discriminants comprises intensity.

7. The process of claim 1, wherein one of said single-frame discriminants comprises radial range.

8. The process of claim 1, wherein one of said single-frame discriminants comprises angular position.

9. The process of claim 1, wherein one of said two-frame discriminants comprises size rate.

10. The process of claim 1, wherein one of said two-frame discriminants comprises intensity rate.

11. The process of claim 1, wherein one of said two-frame discriminants comprises radial range rate.

12. The process of claim 1, wherein one of said two-frame discriminants comprises angular rate.

13. The process of claim 1, wherein one of said two-frame discriminants comprises angular heading.

14. The process of claim 1, wherein one of said three-frame discriminants comprises size acceleration.

15. The process of claim 1, wherein one of said three-frame discriminants comprises intensity acceleration.

16. The process of claim 1, wherein one of said three-frame discriminants comprises radial range acceleration.

17. The process of claim 1, wherein one of said three-frame discriminants comprises angular acceleration.

18. The process of claim 2, wherein one of said four-frame discriminants comprises size jerk.

19. The process of claim 2, wherein one of said four-frame discriminants comprises intensity jerk.

20. The process of claim 2, wherein one of said four-frame discriminants comprises radial jerk.

21. The process of claim 2, wherein one of said four-frame discriminants comprises angular jerk.

22. The process of claim 3, wherein one of said higher-frame discriminants comprises target body rotation rate.

23. The process of claim 3, wherein one of said higher-frame discriminants comprises target emissivity.

24. The process of claim 3, wherein one of said higher-frame discriminants comprises target absorptivity.

25. The process of claim 3, wherein one of said higher-frame discriminants comprises target reflectivity.

26. The process of claim 3, wherein one of said higher-frame discriminants comprises target mass.

27. The process of claim 3, wherein one of said higher-frame discriminants comprises target plume periodicity.

28. The process of claim 1, wherein one of said two-frame discriminants comprises range insensitive axis.

29. The process of claim 3, wherein one of said higher-frame discriminants comprises target shape (higher order geometric moments).

30. The process of claim 1, wherein a unique nearest neighbor identification process identifies those said blips that are separated from all other said blips by at least two pixels and correlate with already established target tracks in said real track table, said target blips being allowed by a blip tracking gate to bypass said two-, three-, four-, (and higher-frame if implemented) discrimination testing and pass directly into said real track table.

31. The process of claim 1, wherein said target data is from multiple collectors.

32. The process of claim 1, wherein said target data is from a scanning radar.

33. The process of claim 1, further including a step of determining position and intensity data for each pixel of said target data before performing steps a–e, above.

34. The process of claim 1, further including a step of calculating the intensity-weighted centroiding and size determination of said target data before performing steps a–e, above.

35. The process of claim 1, further including a step of recording the intensity of the most intense pixel of said target data if the pixel size is greater than 1 before performing steps a–e, above.

36. The process of claim 1, wherein said process performs data fusion if said target data is multi-band before performing said discriminant processing.

37. The process of claim 1, further including the step of partitioning said incoming target data before performing step a–e, above, if the number of said blips received per frame exceeds the capacity of said discriminant processing.

38. The process of claim 1, wherein said target data and said target tracks are in a rectangular coordinate system.

39. The process of claim 1, wherein said target data and said target tracks are in a radial coordinate system.

40. The process of claim 1, wherein said target data and said target tracks are in a spherical coordinate system.

41. The process of claim 1, wherein said target data and said target tracks are in a cylindrical coordinate system.

42. The process of claim 1, wherein at least one of said steps of discriminating against and rejecting blips comprises using parallel processing to speed up the processing.

43. The process of claim 42, wherein at least one of said parallel processing steps uses parallel code instead of sequential code and also uses processors designed specifically for parallel code instead of sequential code to speed up the processing.

44. The process of claim 1, wherein at least one of said steps of discriminating against and rejecting blips comprises using vector processing to speed up the processing.

45. The process of claim 1, wherein said step of assigning said remaining blips to target tracks comprises using a modified Hopfield Neural Net to minimize the sum of all the distances from each blip to its assigned target track.

46. The process of claim 31, further including the step of performing target track registration following said step of assigning remaining blips real track table if said target data is from a multiple collector.

47. The process of claim 1, wherein a duration of said frames is ended when said processing for said frame is completed.

48. The process of claim 1, wherein a duration of said frames is varied pseudorandomly to provide a high resistance to jamming.

49. The process of claim 1, wherein said process uses an expert system, comprising the steps of:

a. monitoring key performance parameters of said process; and, b. regulating said key performance parameters to minimize total processing time including, but not limited to, regulating the number of said partitions.

50. The process of claim 49, wherein said step of regulating includes regulating the number of pixels on said pixel plane representation by which said blips must be separated in order to have no near neighbors.

51. The process of claim 49, wherein said step of regulating includes regulating the number of said frames to use for discriminating against false targets.

52. The process of claim 49, wherein said step of regulating includes regulating a frame rate to allow sufficient time for processing all said target data.

53. The process of claim 49, wherein said step of regulating includes varying said frame rate in a pseudorandom manner to provide a high resistance to jamming.

* * * * *

UNITED STATES PATENT AND TRADEMARK OFFICE
CERTIFICATE OF CORRECTION

Page 1 of 2

PATENT NO : 5,657,251
DATED : August 12, 1997
INVENTOR(S): Harvey E. Fiala

It is certified that error appears in the above-identified patent and that said Letters Patent is hereby corrected as shown below:

Column 2, line 17, change "fries" to --files--
Column 3, line 7, change "fight" to --right--
Column 4, line 25, change "faltering" to --filtering--
Column 7, line 15, add parenthesis "(" before --IWCF)--
      line 57, change "intensifies" to --intensities--
Column 8, lines 6 and 9, change "flames" to --frames--
Column 9, line 2, change "he" to --be--
      line 63, change "limes" to --times--
Column 10, line 2, change "fries" to --files--
Column 11, line 13, change "ruing" to --firing--
      line 57, change "mining" to --turning--
Column 12, line 21, change "rapid/y" to --rapidly--
Column 13, line 2, change "bums" to --burns--
Column 15, line 28, change "analog-m-digital" to --analog-to-digital--
Column 16, line 2, unbold "80"
      line 3, unbold "40"
      line 5, unbold "40"
      line 28, change "dam" to --data--
      line 64, change "flames" to --frames--
Column 18, line 45, change "fries" to --files--
Column 19, line 35, change "flames" to --frames--
      line 53, change "flames" to --frames--
      line 62, change "flames" to --frames--

UNITED STATES PATENT AND TRADEMARK OFFICE
CERTIFICATE OF CORRECTION

PATENT NO.   : 5,657,251
DATED        : August 12, 1997
INVENTOR(S)  : Harvey E. Fiala It is certified that error appears in the above-identified patent and that said Letters Patent is hereby corrected as shown below:

Column    20, line 37, change "Hop field" to --Hopfield--
Column    21, line 15, change "butt" to --built--

Signed and Sealed this

Twenty-seventh Day of January, 1998

Attest:

BRUCE LEHMAN

Attesting Officer

Commissioner of Patents and Trademarks